Jan. 13, 1970  E. E. MANTEUFEL  3,489,454
CAMPER ANCHORING BRACKET
Filed Dec. 11, 1968
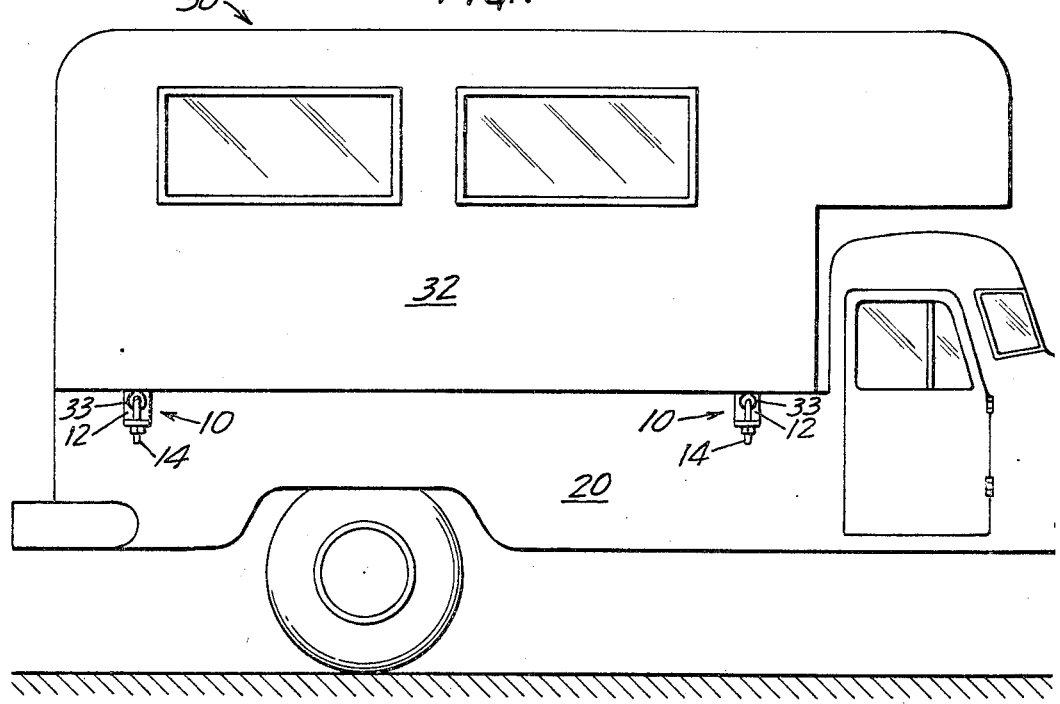
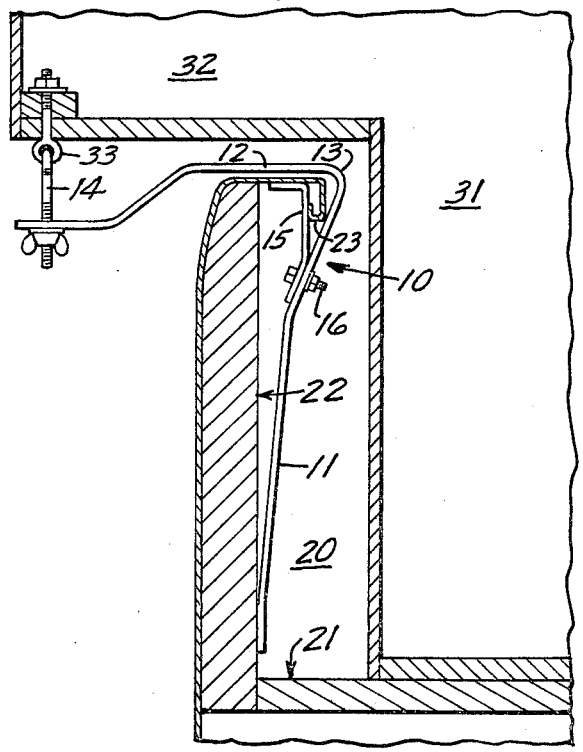
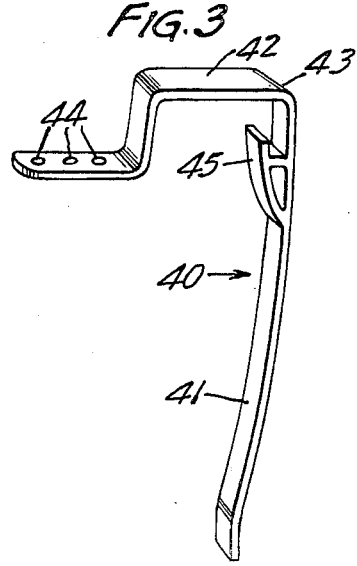
INVENTOR.
ELDRED E. MANTEUFEL
BY
ATTORNEY

United States Patent Office 3,489,454
Patented Jan. 13, 1970

3,489,454
CAMPER ANCHORING BRACKET
Eldred E. Manteufel, Rte. 4, St. Peter, Minn. 56082
Filed Dec. 11, 1968, Ser. No. 783,091
Int. Cl. B60p 3/32; B62d 23/00
U.S. Cl. 296—23                                      8 Claims

ABSTRACT OF THE DISCLOSURE

A camper is firmly and simply attached to a pickup truck by a plurality of brackets, each having two legs which are disposed at an angle to each other and connected by a knee. A spur, adjacent the interior angle of the knee, engages the lip at the top of the truck box side walls, one leg of the bracket being attached to the cantilevered camper wing and the other being forced against the inner aspect of the side wall.

BACKGROUND OF THE INVENTION

This invention relates to mounting brackets and is primarily concerned with brackets for removably attaching a camper to a pickup truck.

The popularity of camping has been on the increase for the past several decades. Campers of the type which are carried in a pickup truck box offer many advantages; for example, they provide the comfort of camping trailers without the problems of parking. Since pickup trucks are rugged machines, campers can be driven into wilderness country and over rough terrain, places where it is almost impossible to maneuver a trailer.

A typical camper is a compact room, having a floor which rests on the bed of the pickup truck box and a pair of wings, one extending over each side wall of the box. It is, of course, essential that the camper be kept from sliding or bouncing as the pickup truck is driven from place to place. It is often desirable for the camper to be readily mounted and demounted, so that the truck can be quickly converted to and from other use. Many attempts have been made to find a means for accomplishing these objectives, but all have had serious disadvantages.

One obvious way of holding the camper in position is to drill holes through both the floor of the camper and the bed of the truck box and bolt the two together. This procedure involves considerable labor, necessitating either jacking the truck up or crawling under it to install the bolts. Not only do the holes in the bed interfere with other uses to which the truck may be put, but it is also difficult to align the holes when the camper is demounted and subsequently mounted again.

Many modern campers have two or more eyebolts extending from the bottom of each cantilevered wing to facilitate mounting; where the camper is not initially supplied with such eyebolts, it is common to install them. A chain or turnbuckle is run from each eyebolt to an eyebolt or a bracket attached to the truck box or lower part of the frame and extending laterally therefrom; see, e.g., U.S. Patents 3,356,408 and 3,368,745. Again, drilling and installation time are drawbacks, and the attaching means must be modified or re-installed for each different camper mounted.

SUMMARY

The present invention provides a simple camper-anchoring bracket which can be mounted and demounted quickly and does not require the drilling of any holes. When a plurality of these brackets are used, they may be mounted at any desired location along the length of the side walls (other than at the fender well or stake pockets), thereby facilitating their use on any late model pickup truck in the mounting of almost all campers. The brackets are made of sturdy, rigid material, so that the camper is held firmly in place. Preferably the clamps are made of spring steel or aligned filament-reinforced resin, the springiness permitting the brackets to give or yield resiliently as the truck box distorts in traversing uneven ground.

Brackets made in accordance with the invention comprise two leg portions connected by a knee portion, which is preferably smoothly curved. The first leg portion extends along the inner portion of the box side wall, while the second leg portion extends above the top of the side wall and is connected to the cantilevered camper wing. A spur portion on the inner aspect of one leg adjacent the knee engages the rolled edge, or inturned lip, of the side wall, which serves as a fulcrum for the bracket.

BRIEF DESCRIPTION OF DRAWINGS

Understanding of the invention will be facilitated by referring to the accompanying drawings, in which:

FIGURE 1 is a side view of a truck having a camper mounted thereon and held in place by brackets made in accordance with the invention;

FIGURE 2 is a view of the left side of the truck box, in cross-section, adjacent the rear of one of the brackets, and FIGURE 3 is a perspective view of another type of bracket made in accordance with the invention.

DESCRIPTION OF PREFERRED EMBODIMENTS

Turning first to FIGURES 1 and 2, brackets 10, the contours of which resemble the numeral 7, are seen to hold cantilevered camper 30 in position in truck box 20. Camper 30 comprises body 31 and cantilivered side wing 32, eye bolts 33 extending from the bottom of wing 32 to assist in mounting. Truck box 20 comprises bed 21 and, side wall 22, the latter having rolled edge, or inturned lip, 23.

Bracket 10 is formed from a strip of spring material, e.g., spring steel having a ¼" x 2½" cross-section, or equivalent material. Bracket 10 comprises first leg portion 11 and second leg portion 12, connected at an acute angle by smoothly curved knee portion 13. It has been found that bracket 10 functions extremely well when the angle at which leg portions 11 and 12 adjacent the knee would intersect, if appropriately extended, is about 75°. First leg portion 11 is so contoured that the end distal from knee portion 13 is substantially perpendicular to second leg portion 12, most of the remainder of leg 11 is at a more acute angle, and the part adjacent knee portion 13 is at a still more acute angle. This conformation permits the distal end of leg portion 11 to bear against the inner aspect of side wall 22, most of leg portion 11 being under lip 23. Leg portion 12 is so configured that the end thereof distal to knee portion 13 falls below lip 23, thereby permitting the exertion of greater force on wing 32. The distal end of leg portion 12 is provided with attaching means to facilitate connection to eyebolt 33. As shown in FIGURE 1, this means comprises J-bolt 14, although a turnbuckle could perform the same function.

Adjacent knee portion 13, spur 15 is connected to leg portion 11 by means of bolt 16, which passes through holes in spur 15 and leg portion 11. If desired, one of these holes may be slotted to facilitate installation of bracket 10.

In making an installation, each bracket 10 is positioned so that spur 15 snugly engages lip 23; bracket 10 is then slid to a position such that leg portion 11 is essentially vertical and leg portion 12 is approximately aligned with the eyebolt 33 of the camper 30 to be mounted. Camper 30 is then placed in box 20 and bracket 10 accurately positioned. Leg portion 12 is then connected to eyebolt 33 by J-bolt 14, which is tightened so that considerable spring tension is exerted. As the truck frame twists in going over rough terrain, the several brackets 10 are able to "give" as needed, maintaining camper 30 firmly in place.

FIGURE 3 depicts bracket 40, which is generally similar to bracket 10, comprising first leg portion 41, second leg portion 42 and connecting knee portion 43. Spur 45 is permanently connected to first leg portion 41, as by welding, increasing the ease of installation and simplifying bracket 40 but requiring somewhat more clearance between spur 45 and leg portion 42. The distal portion of leg portion 42 may be provided with a series of holes 44, facilitating attachment to cantilevered camper wings in which the eyebolts are located various distances outward from the box side walls. If desired, any excess length of second leg portion 42 may be cut off. Alternatively, of course, further extensions can be bolted on.

It will be appreciated that the foregoing illustrative embodiments of the invention are not to be considered limitative, as numerous variations can be made without departing from the spirit of the invention.

I claim:
1. A bracket possessing particular utility for mounting a camper on a pickup truck which has a bed and sidewalls with inturned lips at the tops thereof, said camper having a body which rests on said bed and lateral wings which extend above and laterally beyond the tops of said side walls, said bracket comprising in combination:
an elongate strip of sturdy material having
a first leg portion slightly shorter than the height of the side walls of the pickup truck box in which said camper is to be mounted,
a second leg portion long enough to extend laterally beyond the side wall of the pickup truck box beneath the wing of said camper,
said leg portions being disposed to each other at an acute angle and connected by a knee portion,
a spur portion connected to said first leg portion adjacent said knee portion, extending across the interior angle of said knee portion and terminating adjacent said second leg portion, and
on said second leg portion, at a location distal from said knee portion, an attaching means adapted to be attached to the bottom of a camper wing, whereby when a camper of the type described is mounted in a truck box of the type described, the bracket can be so positioned that said spur engages one of the lips of the side wall, said first leg extending downwardly along the interior of said side wall and said second leg extending laterally above and beyond said side wall, and said attaching means can be attached to the lower portion of the corresponding camper wing, thereby firmly connecting said camper to said truck box.

2. The bracket of claim 1 wherein the clamp is made of a strip of spring material.

3. The bracket of claim 2 wherein the contours of the clamp resemble the numeral 7.

4. The bracket of claim 1 wherein the second leg is so contoured that the portion thereof distal from the knee portion lies within the angle defined by an extension of the leg portions adjacent said knee portion.

5. The bracket of claim 1 wherein the first leg portion is so contoured that the portion thereof distal from the knee portion is disposed at a greater angle, with respect to the second leg portion, than the portion thereof adjacent said knee portion.

6. The bracket of claim 1 wherein the spur is connected to the first leg portion by a bolt passing through both, whereby said spur may be pivoted to facilitate installation and removal of said clamp.

7. The bracket of claim 1 wherein, at the locus where the bolt passes through the spur and first leg portion, a slot is provided to permit sliding said spur lengthwise of said first leg portion, further facilitating installation and removal of said clamp.

8. The bracket of claim 1 wherein, if the leg portions adjacent the knee portion were extended to intersect, the angle of intersection would be about 75°.

References Cited

UNITED STATES PATENTS 3,356,408   12/1907   Stutz _____ 296—23

LEO FRIAGLIA, Primary Examiner

R. R. SONG, Assistant Examiner

U.S. Cl. X.R.

296—35